United States Patent [19]

Kuntz

[11] Patent Number: 5,117,876

[45] Date of Patent: Jun. 2, 1992

[54] DEFUELING FITTING AND METHOD FOR REMOVING FUEL FROM AN AIRCRAFT FUEL CELL

[75] Inventor: James P. Kuntz, Spokane, Wash.

[73] Assignee: Spokane Industries, Inc., Spokane, Wash.

[21] Appl. No.: 683,890

[22] Filed: Apr. 11, 1991

[51] Int. Cl.⁵ .......................................... F16M 13/02
[52] U.S. Cl. .......................................... 141/7; 141/65; 141/98; 141/231; 141/383; 184/1.5; 184/109; 285/9.2
[58] Field of Search .................... 141/1, 7, 8, 65, 231, 141/98, 275, 383; 184/1.5, 106, 109; 285/9.2

[56] References Cited

U.S. PATENT DOCUMENTS

| | | | |
|---|---|---|---|
| 1,951,498 | 3/1934 | Whitney | 184/1.5 |
| 1,994,844 | 3/1935 | Winger et al. | 184/1.5 |
| 3,387,621 | 6/1968 | Schaff | 184/1.5 X |
| 4,098,398 | 7/1978 | Meyers | 206/223 |
| 4,566,722 | 1/1986 | Huber et al. | 403/15 X |
| 4,592,448 | 6/1986 | Morris | 184/1.5 |
| 4,776,431 | 10/1988 | Poling | 184/1.5 |
| 4,865,156 | 9/1989 | Poling | 184/1.5 |
| 4,883,102 | 11/1989 | Gabrielyan et al. | 141/98 |
| 5,048,578 | 9/1991 | Dorf et al. | 141/346 |

OTHER PUBLICATIONS

Spokane Metal Products Brochure, "Bowser Fuel Drain Tanks" (undated).

Primary Examiner—Ernest G. Cusick
Attorney, Agent, or Firm—Wells, St, John & Roberts

[57] ABSTRACT

A defueling fitting is adapted to facilitate removal of fuel from an aircraft fuel cell through a flush-mounted fuel drain having a depressable valve stem. It includes a flange with spaced circumferential seals. A vacuum outlet leads between the seals to facilitate attachment of the flange to an exterior aircraft surface surrounding a fuel drain. A separable probe includes a pin actuator for depressing the valve stem of the fuel drain and one or more liquid passages for directing draining fuel through the flange through an attached hose. The method for defueling involves first attaching the flange to the aircraft surface surrounding a fuel drain by application of reduced pressure between the circumferential seals and subsequently depressing the valve stem of the fuel drain to direct fuel through an enclosed liquid passage.

27 Claims, 4 Drawing Sheets

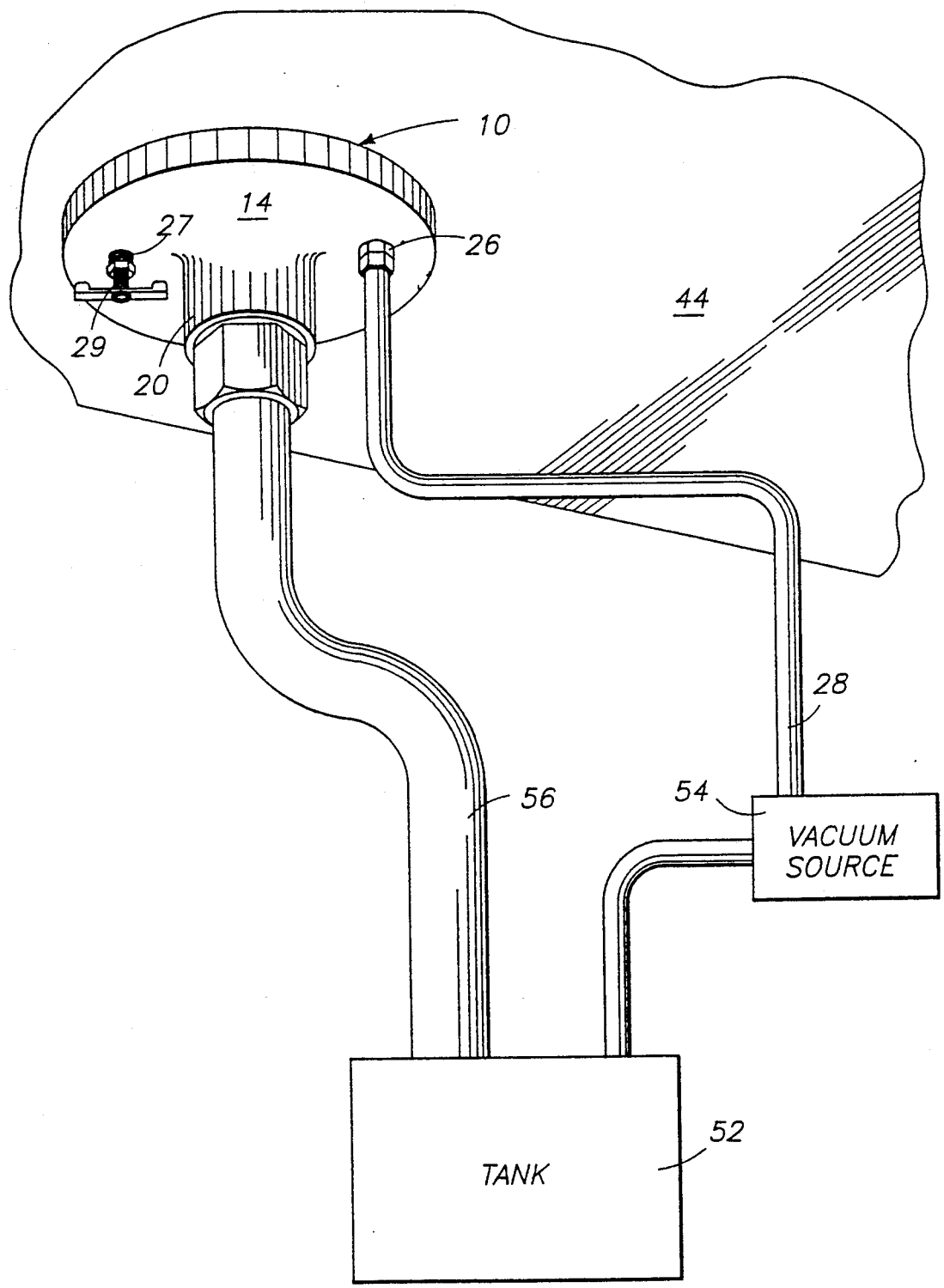

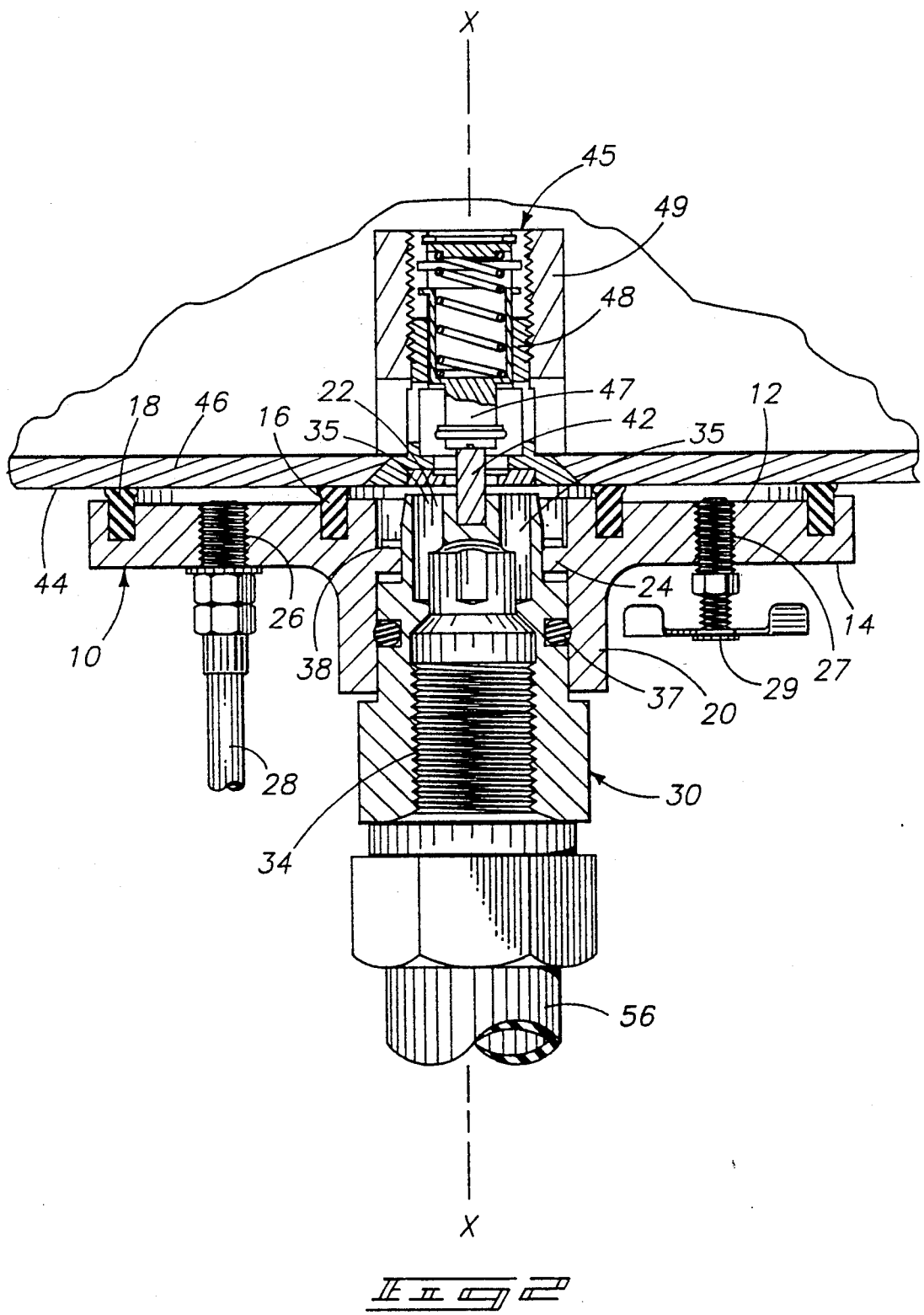

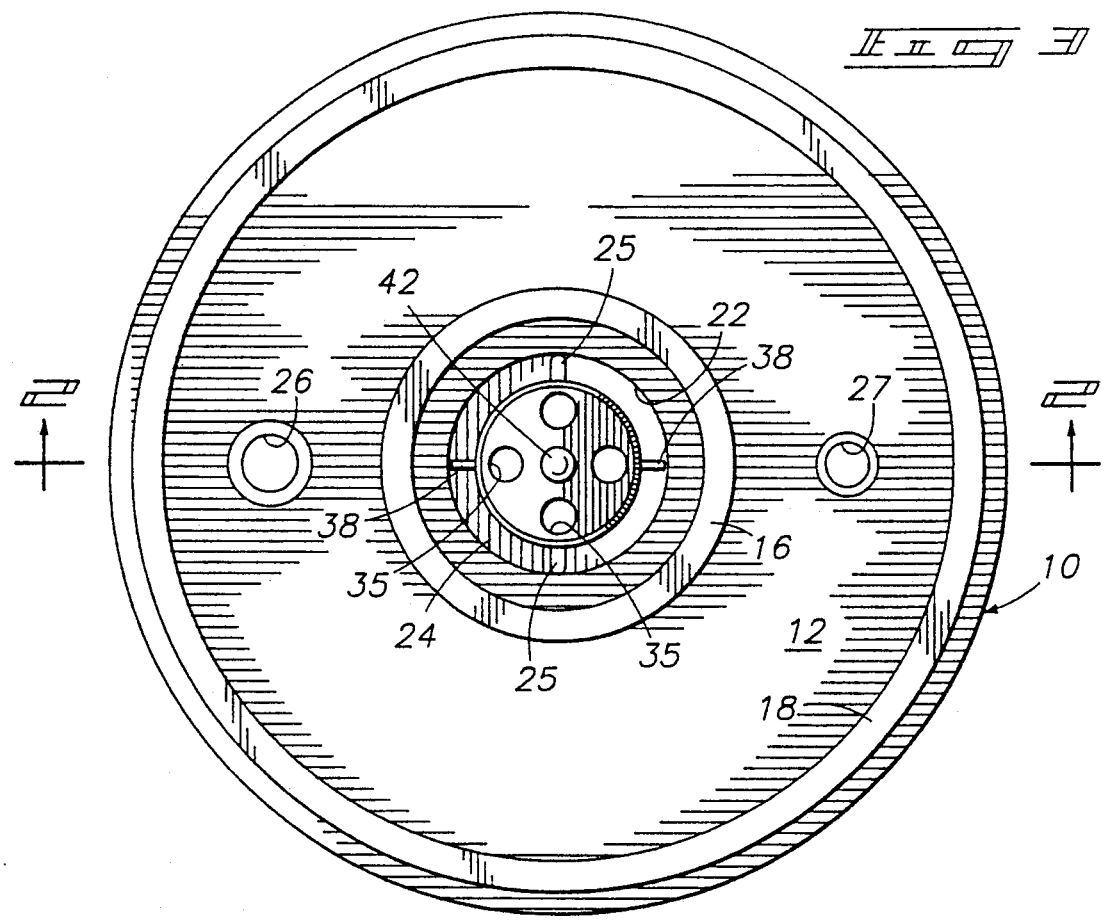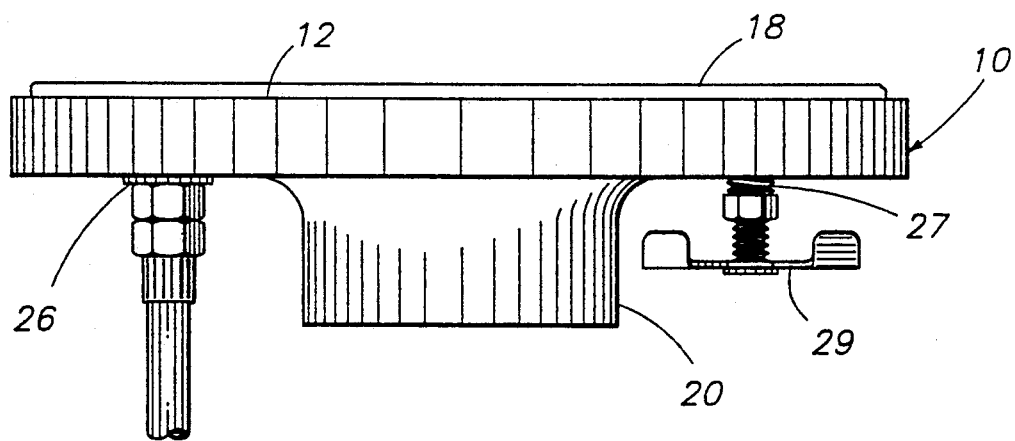

DEFUELING FITTING AND METHOD FOR REMOVING FUEL FROM AN AIRCRAFT FUEL CELL

TECHNICAL FIELD

This disclosure pertains to a universal defueling fitting adapted to be attached to the exterior of an aircraft fuel cell. It is held to the fuel cell by vacuum pressure to facilitate removal of fuel through conventional spring-biased fuel drains at the exterior of a fuel cell.

BACKGROUND OF THE INVENTION

Defueling operations with respect to aircraft are primarily associated with servicing and maintenance of the aircraft's fuel cells. Because of the highly flammable nature of aircraft fuel, safety precautions require total removal of fuel before such cells can be worked upon. Draining of fuel from within the fuel cells consumes substantial time prior to initiation of related servicing and maintenance procedures.

In many applications, the valve stem is simply manually depressed and locked in a depressed condition to permit fuel to drain by gravity and simply fall onto the ground or other surfaces beneath the fuel drain. This results in undesirable exposure to the draining fuel by both servicing personnel and the surrounding ground surface areas.

While gravity fuel drains are provided at the lower exterior surfaces about such fuel cells, conventional manual draining procedures typically require time periods of up to 8 to 10 hours before all fuel is completely drained from within all the fuel cells of a large aircraft.

Vacuum systems have been applied to substantially reduce the time required for draining a fuel cell. By attaching a vacuum hose to a fuel drain, a vacuum system can completely drain the fuel cells of a large aircraft in a period of approximately one hour. This not only reduces delays in servicing the fuel cells, but substantially increases the available flying time for the aircraft being serviced.

Funnels have been telescopically mounted to abut the surrounding surface to release fuel from within the fuel cell by gravity through opened fuel drains. However, the use of such a funnel still requires that the fuel drain valve stem be manually depressed, which results in initial loss of fuel and presents a potentially messy manual procedure to those working under the fuel cell.

Recent systems have been developed for using vacuum pressure to speed up the draining procedure. Current vacuum systems utilize specialized fuel cell attachments designed to mechanically engage specific fuel drain configurations. This limits the use of such attachments to the specified fuel drains. Such special attachment designs require servicing personnel to maintain an inventory of attachments matching the design requirements of fuel drain cells that might be encountered at a particular facility. Because there are wide variations in fuel drain designs, depending upon specific requirements of different aircraft manufacturers and users, mechanical fuel cell attachments have been found to have very limited practical application in the field of aircraft maintenance.

The present defueling fitting is designed to provide a more universal fuel cell attachment. It can be effectively utilized in conjunction with a variety of conventional flush-mounted fuel drains used today in aircraft fuel cells. It requires no direct mechanical attachment to the fuel drain itself. It is held to the surrounding exterior aircraft surface by vacuum pressure and can be readily released after the draining procedure has been accomplished. It confines the draining fuel so that it can be directed through an attached hose to a receiving portable or stationary tank. Fuel can be drained through the fitting by gravity or by a vacuum defueling system.

BRIEF DESCRIPTION OF THE DRAWINGS

The preferred embodiment of the invention is illustrated in the accompanying drawings, in which:

FIG. 1 is a perspective view diagrammatically illustrating use of the defueling fitting;

FIG. 2 is a sectional view taken along line 2—2 in FIG. 4, illustrating operation of the defueling fitting in conjunction with a conventional fuel drain.

FIG. 3 is a front plan view of the assembled defueling fitting;

FIG. 4 is a side view of the supporting flange;

DETAILED DESCRIPTION OF THE PREFERRED EMBODIMENTS

Figure 5:
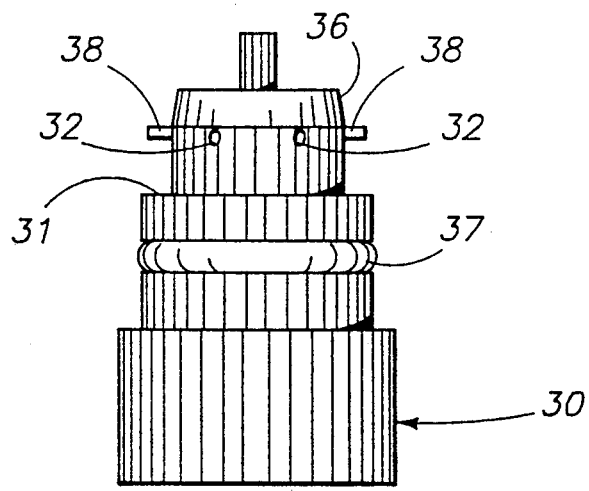
FIG. 5 is a side view of the center probe.
Figure 6:
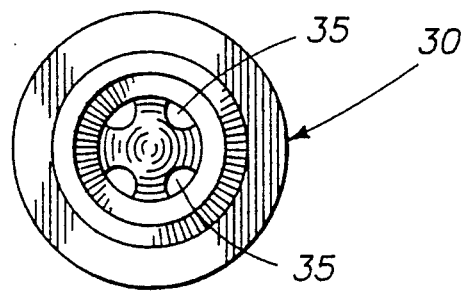
FIG. 6 is a rear view of the probe.

The following disclosure of the invention is submitted in furtherance with the constitutional purpose of the Patent Laws "to promote the progress of science and useful arts" (Article 1, Section 8).

The defueling fitting illustrated in the drawings is designed for removal of fuel from an aircraft fuel cell. As used herein, the term "fuel cell" shall include all forms of fuel tanks provided on aircraft, including fuel cells provided within the wings of fixed wing aircraft and within the fuselage of helicopters and other movable wing aircraft, as well as supplementary fuel tanks suspended from the aircraft structure. Such fuel cells on aircraft are normally provided with one or more conventional flush-mounted fuel drains.

For spatial orientation only, the various elements of the defueling fitting will be described in relation to their relative positions along a central axis through the fitting while it is in use on an aircraft, as shown in FIG. 1. The axial end of the fitting that faces toward the aircraft will be referred to its "front" and its opposite axial end will be referred to as its "rear."

The flush-mounted fuel drains 45 used in aircraft today typically include a spring-biased valve stem 47 that is normally seated in a closed position within a surrounding housing 48. Housing 48 is fixed within a structural support 49 inside the fuel cell, as can be seen in FIG. 2. The fuel drain 45 is mounted flush with the exterior skin 46 of the fuel cell and is surrounded by its exterior surface 44.

Depressing the valve stem 47 releases fuel from within the interior of the fuel cell, which is vented by opening its filler assembly (not shown). The valve stem 47 is designed to be manually depressed from the exterior of the fuel cell by engaging its outer end by use of a screwdriver. When the valve stem 47 is fully depressed, it can also be turned about its central axis to lock it in the depressed condition due to resulting interengagement of a bayonet-type locking arrangement included in the valve stem 47 and surrounding fuel drain housing 48.

As shown in FIG. 2, the valve stem 47 included within a typical fuel drain is spring-biased to a closed condition within a surrounding housing 48. The outer end of valve stem 47 is transversely slotted so that it can be engaged by a screw driver or other axially movable tool used to push valve stem 47 inwardly and allow fuel to drain freely through the resulting opening. The same tool can also be used to turn valve stem 47 about its axis to engage a bayonet-type lock that maintains valve stem 47 in a depressed condition during the draining process. Similar fuel drains are very common in modern aircraft design. Additional details concerning their construction is not believed to be necessary to an understanding of the present invention.

The defueling fitting basically comprises a flange 10 having a surface 12 adapted to overlap and face a fuel drain 45 at the exterior surface of a fuel cell. Inner and outer circumferential seals 16 and 18 are spaced from one another across the flange surface 12. They are adapted to surround an overlapped fuel drain 45. Vacuum outlet means 26 extends through the flange surface 12 at a location positioned between the inner and outer circumferential seals 16, 18 for selectively applying reduced pressure about an area of the surface 12 bounded by the seals for attaching flange 10 to a complementary exterior surface 44 adjacent to a fuel drain 45. One or more liquid passages lead from a location on the flange 10 surrounded by the inner circumferential seal 16 to carry draining fluid. Actuator means 42 is provided for selectively depressing the valve stem 47 of a fuel drain 45 while it is overlapped by the flange 10.

The preferred form of universal fitting for fuel drains is illustrated in the accompanying drawings. It comprises a solid supporting flange 10 and a separable central drain probe 30. The central axis of the assembled flange 10 and probe 30 is illustrated by line X—X in FIG. 2. The mechanical and functional features of these two separable elements can also be provided in an integral assembly, as will be apparent from the detailed descriptions that follow.

The solid flange 10 and probe 30 can be made from any suitable material. Initial versions of the defueling fitting have been machined from aluminum stock. Other metallic and nonmetallic materials, both rigid or flexible, can be substituted.

The flange 10 has opposed first (front) and second (rear) surfaces 12, 14. Inner and outer circumferential seals 16, 18 are fitted about the front surface 12 of flange 10 within complementary receiving grooves. Seals 16 and 18 are adapted to form concentric liquid-tight seals against the exterior skin 46 of the aircraft or fuel cell surrounding a flush-mounted fuel drain 45. They are shown as being circular in shape. Seals 16 and 18 are concentrically spaced from one another across the first flange surface 12. The previously-identified axis X—X is also common to the concentric seals 16 and 18.

The illustrated seals 16 and 18 have been made from closed-cell foamed resins that are impervious to aircraft fuel. The seals 16 and 18 must be flexible in order to conform to surface variations that might be encountered about a particular fuel drain. While the illustrated concentric arrangement of seals 16, 18 and probe 30 lends itself to matching the surface configurations typically encountered about fuel drains surrounded at all sides by substantial surface areas, the concentric seals might be crowded more closely toward one another at one side of the flange 10 to facilitate attachment to aircraft surfaces bounding a fuel drain near an edge or corner about a wing or fuselage.

A vacuum outlet 26 is provided on the flange 10. It is shown as a threaded aperture extending axially between first and second surfaces 12 and 14. The vacuum outlet extends through the first flange surface 12 at a location positioned between the inner and outer circumferential seals 16, 18 for selectively applying reduced pressure about an area of the first flange surface 12 bounded by the seals to attach the flange 10 to a complementary exterior surface surrounding a fuel drain while overlapping it.

Vacuum outlet 26 extends through the first flange surface 12 at a location positioned between the inner and outer circumferential seals 16, 18 for selectively applying reduced pressure about an area of the first flange surface 12 bounded by them. This application of reduced pressure is used to attach the flange 10 to a complementary exterior surface surrounding a fuel drain, as exemplified by surface 44 shown in FIGS. 1 and 2.

A complementary vent 27 is illustrated as being located on flange 10 at the opposite side of its center. The vent 27 extends through the first flange surface 12 to a location positioned between the seals 16, 18 for selectively equalizing pressure across the opposed flange surfaces 12, 14 by admitting ambient air to the area adjacent to the first flange surface 12 that lies between the respective seals.

Fittings leading to a source of vacuum pressure 54 can be attached to the threaded vacuum outlet 26. These fittings might include a check valve (not shown) used to maintain vacuum pressure during interruptions in the operation of the source of vacuum pressure. Such fittings, of conventional design, can be attached to a hose 28 leading to vacuum source 54. Alternately, the vacuum outlet 26 might be in direct communication with a manually-activated portable vacuum pump (not shown) mounted to flange 10. Such manually actuated vacuum pumps are well known, and are widely used in vacuum devices used for lifting panes of glass, etc.

The vent outlet 27 shown in the illustrated embodiment is also a threaded aperture leading between surfaces 12 and 14. A manually-actuated relief valve 29 can be threaded to the vent outlet 27. The relief valve 29 might include a rotatable valve stem for admitting ambient air to the sealed area across surface 12.

The exterior of probe 30 is complementary to the interior of a central aperture 22 formed through a rearwardly protruding hub 20 at the center of flange 10. The complementary surfaces of probe 30 and aperture 22 are sealed axially by a circular O-ring 37 seated within an annular groove formed about the exterior of the probe.

One or more axial liquid passages lead through the flange 10 from an area surrounded by the inner circumferential seal 16. The liquid passages include the front end of aperture 22 as well as radial and axial openings 32, 35 formed through a separable drain probe 30 and leading to the open rear end of probe 30.

Probe 30 is held within aperture 22 by mechanical interengagement between radially protruding pins 38 adjacent the front end of probe 30 and a complementary annular rib 24 that protrudes radially inward within the flange 10. Rib 24 is interrupted by diametrically opposed slots 25. Each slot 25 has a width sufficient to permit passage of one of the radial pins 38.

The front end 36 of probe 30 has a diameter complementary to the inner diameter of rib 24. Probe 30 also includes a shoulder 31 adapted to limit inward motion of probe 30 relative to the receiving flange 10 by abutting the rear surface of rib 24 following passage of pins 38 through the receiving slots 25.

Attachment of probe 30 to flange 10 involves axial insertion of its front end 36 into the flange 10 until shoulder 31 abuts rib 24. This insertion step requires that pins 38 be initially aligned with the receiving slots 25 for free passage through them. After pins 38 have passed inwardly beyond the boundaries of slots 25, probe 30 can be manually turned (preferably about 90 degrees) about axis X—X. Pins 38 will then prevent rearward movement of probe 30 relative to flange 10 and axially locate probe 30 relative to flange 10.

Because probe 30 will normally be hanging beneath a fuel cell, it will not be subjected to any turning moment that might accidentally realign pins 38 and slots 25. When vacuum pressure is used to facilitate fuel removal, the forces exerted on probe 30 by the compressed spring within the fuel drain 45 will hold radial pins 38 tightly against the abutting surface of rib 24.

The axial liquid passage through probe 30 is shown as a plurality of radially spaced inlets 35 surrounding pin 42 and leading to a threaded outlet 34 formed within probe 30. The inlets 35 are in communication with radial openings 32 to assure free flow of fuel through the probe 30. Fittings for a drain hose 56 can be attached to the threaded outlet 34 as required in a particular application. Such conventional fittings might include check valves, manually operable valves, quick-release members and other conventional devices as required to direct fuel to the receiving tank 52.

An actuator is provided to selectively depress the valve stem 47 of an aircraft fuel cell drain while surrounded by the flange 10. The actuator illustrated in the preferred embodiment is a fixed axial pin 42 protruding inwardly from the front of probe 30. It extends axially beyond the adjacent first surface 12 on flange 10 when probe 30 is assembled within the receiving aperture 22. It is to be understood that the actuator can be movable if desired, to thereby depress the valve stem 47 manually or automatically after attachment of flange 10 to the exterior aircraft surface surrounding a selected fuel drain 45.

The present method for removing fuel from an aircraft fuel cell involves the steps of first attaching the solid flange 10 to an exterior surface surrounding a fuel drain 45 by application of reduced pressure about the first surface area 12 of the flange bounded by the inner and outer circumferential seals 16, 18 that are spaced from one another. The valve stem 47 of the overlapped fuel drain 45 is then depressed to direct fuel from within the fuel cell through liquid passages 32 and 35 extending through the flange 10.

The draining fuel can be directed through a flexible hose 56 to a stationary or mobile receiving tank 52. While the fuel can be drained by gravity, it is preferable to utilize reduced pressure applied to the interior of hose 56 by means of a vacuum source 54 operably associated with the receiving tank 52. The vacuum source 54 can be a pump or an air-actuated venturi vacuum generator, the latter being preferable in the flammable environment within which the present invention is to be used.

Details of the liquid-receiving tank and associated vacuum source as contemplated within the vacuum system diagrammatically shown in FIG. 1 are well-known to those skilled in this field. No further explanation appears necessary in order to enable one to design an effective vacuum system for use in conjunction with the defueling fitting described and shown in the accompanying drawings.

Figure 7:
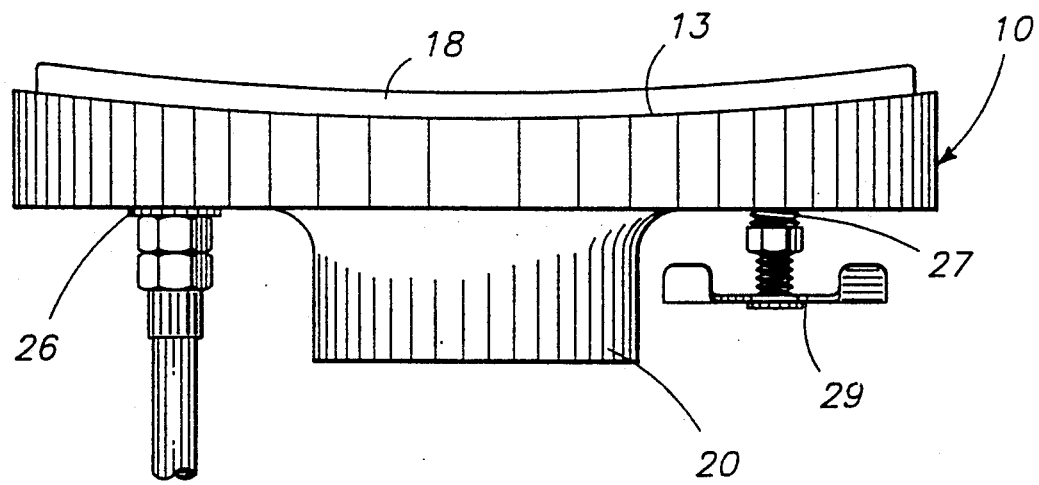
FIG. 7 is a side view of a second embodiment of the flange.

While the defueling fitting shown in FIGS. 1-6 has a planar first surface 12 and relies upon compression of seals 16, 18 to conform to the typically curved configurations of exterior aircraft surfaces, it is to be understood that the front surface of flange 10 can alternately be transversely curved, as illustrated in FIG. 7. The defueling fitting shown in transverse section in FIG. 7 is essentially identical to that shown in FIGS. 1-6, with the exception that its first (front) surface 13 is transversely curved. Such transverse curvature is of particular value in matching the more extreme curvatures that might be encountered about fuel drains included at wing pods and other auxiliary tanks on aircraft.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A defueling fitting for removing fuel from an aircraft fuel cell including one or more flush-mounted fuel drains each having a valve stem that is depressible relative to a smoothly contoured exterior surface surrounding it to thereby release fuel from within the fuel cell, comprising:

a flange having a surface adapted to overlap and face a fuel drain at the exterior surface of a fuel cell;

inner and outer circumferential seals spaced from one another across the flange surface adapted to surround an overlapped fuel drain;

vacuum outlet means extending through the flange surface at a location positioned between the inner and outer circumferential seals for selectively applying reduced pressure about an area of the surface bounded by the inner and outer circumferential seals for attaching the flange to a complementary exterior surface adjacent to a fuel drain;

one or more liquid passages leading from a location on the flange surrounded by the inner circumferential seal and adapted to carry draining fluid; and actuator means for selectively depressing the valve stem of a fuel drain while it is overlapped by the flange.

2. The defueling fitting of claim 1, wherein the flange surface is planar.

3. The defueling fitting of claim 1, wherein the flange surface is transversely curved.

4. The defueling fitting of claim 1, further comprising:

a separable probe releasably mounted within the flange at a position surrounded by both the inner and outer circumferential seals, the one or more liquid passages being formed through the probe.

5. The defueling fitting of claim 1, further comprising:

a separable probe releasably mounted within the flange at a position surrounded by both the inner and outer circumferential seals, the actuator and the one or more liquid passages being part of the probe.

6. The defueling fitting of claim 1, further comprising:
a vacuum system operably connected to the one or more liquid passages, the vacuum system being adapted to draw fuel through a fuel drain overlapped by the flange.

7. A defueling fitting for removing fuel from an aircraft fuel cell including one or more flush-mounted fuel drains each having a valve stem that is depressible relative to a smoothly contoured exterior surface surrounding it to thereby release fuel from within the fuel cell, comprising:
a solid flange having opposed first and second surfaces;
inner and outer circumferential seals spaced from one another across the first flange surface and adapted to surround a fuel drain on an aircraft fuel cell while overlapped by the flange;
vacuum outlet means on the flange, the vacuum outlet means extending through the first flange surface at a location positioned between the inner and outer circumferential seals for selectively applying reduced pressure about an area of the first flange surface bounded by the inner and outer seals to attach the flange to a complementary exterior surface surrounding a fuel drain;
a probe on the flange, the probe and flange including one or more liquid passages leading from a location surrounded by the inner circumferential seal; and
an actuator adapted to selectively depress the valve stem of a fuel drain on an aircraft fuel cell overlapped by the flange.

8. The defueling fitting of claim 7, wherein the first flange surface is planar.

9. The defueling fitting of claim 7, wherein the first flange surface is transversely curved.

10. The defueling fitting of claim 7, wherein the probe and flange are separable.

11. The defueling fitting of claim 7, wherein the probe and flange are separable; and
releasable means on the probe and flange for selectively locking them to one another.

12. The defueling fitting of claim 7, further comprising:
vent means extending through the first flange surface to a location positioned between the inner and outer circumferential seals for selectively equalizing pressure across the opposed flange surfaces by admitting ambient air to the area adjacent to the first flange surface that lies between the respective inner and outer circumferential seals.

13. The defueling fitting of claim 7, wherein the actuator is a fixed projection on the probe that protrudes axially outward beyond the first flange surface.

14. The defueling fitting of claim 7, further comprising:
a vacuum system operably connected to the one or more liquid passages; the vacuum system being adapted to draw fuel through a fuel drain about which the flange is attached while overlapping the fuel drain.

15. A defueling fitting for removing fuel from an aircraft fuel cell including one or more flush-mounted fuel drains each having a valve stem that is depressible relative to a smoothly contoured exterior surface surrounding it to thereby release fuel from within the fuel cell, comprising:
a solid flange having opposed first and second surfaces;
a pair of concentric seals spaced from one another across the first flange surface and adapted to surround a fuel drain on an aircraft fuel cell, the pair of concentric seals being centered about an axis that intersects the flange;
an aperture formed through the flange at a location positioned inwardly of both seals in the pair of concentric seals;
a vacuum outlet extending through the first flange surface at a location positioned between the pair of concentric seals for selectively applying reduced pressure about an area of the first flange surface bounded by the pair of concentric seals to attach the flange to a complementary exterior surface surrounding a fuel drain;
a probe sealed within the aperture of the flange, the probe including at least one axial liquid passage leading through it; and
an actuator adapted to selectively depress the valve stem of a fuel drain on an aircraft fuel cell while the probe is surrounded by the flange.

16. The defueling fitting of claim 15, wherein the probe and flange are separable.

17. The defueling fitting of claim 15, wherein the probe and flange are separable; and
an interlocking radial pin and complementary slotted annular rib on the probe and flange for selectively locking them to one another.

18. The defueling fitting of claim 15, further comprising:
a vent formed through the flange and leading to a location on the first flange surface between the pair of concentric seals, the vent including a manually operable valve for selectively equalizing pressure across the opposed flange surfaces by admitting ambient air through the vent to the area adjacent to the first flange surface that lies between the respective seals of the pair of concentric seals.

19. The defueling fitting of claim 15, wherein the actuator is a fixed projection on the probe.

20. The defueling fitting of claim 15, wherein the actuator is a fixed axial pin centered about the seal axis on the probe.

21. A defueling fitting for removing fuel from an aircraft fuel cell including one or more flush-mounted fuel drains each having a valve stem that is depressible relative to a smoothly contoured exterior surface surrounding it to thereby release fuel from within the fuel cell, comprising:
a solid flange having a circular rim bounding opposed first and second surfaces;
a pair of concentric circular seals centered about an axis central to the rim, the pair of seals being spaced from one another across the first flange surface;
a vacuum outlet extending through the flange to a location positioned between the pair of seals for selectively applying reduced pressure adjacent to the area of the first flange surface that is bounded by the pair of seals;
a central aperture extending through the flange and centered on the axis, the aperture being formed inwardly of the pair of seals;

a complementary probe sealed within the central aperture of the flange, the probe including at least one liquid passage leading axially through it; and an actuator adapted to selectively depress a fuel drain on an aircraft fuel cell while the probe is surrounded by the flange.

22. The defueling fitting of claim 21, further comprising:

a vent formed through the flange and leading to a location on the first flange surface between the pair of concentric circular seals, the vent including a manually operable valve for selectively equalizing pressure across the opposed flange surfaces by admitting ambient air through the vent to the area adjacent to the first flange surface that lies between the respective seals of the pair of concentric seals.

23. The defueling fitting of claim 21, further comprising:

a vacuum system operably connected to the liquid passage of the probe, the vacuum system being adapted to draw fuel through a fuel drain about which the flange is attached while the actuator is depressing the valve stem of the fuel drain.

24. A method for removing fuel from an aircraft fuel cell including one or more flush-mounted fuel drains each having a valve stem that is depressible relative to a smoothly contoured exterior surface surrounding it to thereby release fuel from within the fuel cell, the method comprising the following steps:

attaching a solid flange to an exterior surface in a position overlapping a fuel drain by application of reduced pressure about a first surface area of the flange bounded by inner and outer circumferential seals spaced from one another and surrounding the fuel drain; and depressing the valve stem of the overlapped fuel drain to direct fuel from within the fuel cell through a liquid passage extending through the flange.

25. The method of claim 24, comprising the following additional step:

applying vacuum pressure to the liquid passage to draw fuel from a fuel cell through the fuel drain about which the flange is attached.

26. A method for removing fuel from an aircraft fuel cell including one or more flush-mounted fuel drains each having a valve stem that is depressible relative to a smoothly contoured exterior surface surrounding it to thereby release fuel from within the fuel cell, the method comprising the following steps:

attaching a solid flange to an exterior surface surrounding a fuel drain by application of reduced pressure about a first surface area of the flange bounded by inner and outer circumferential seals spaced from one another and surrounding the fuel drain; and depressing the valve stem of the fuel drain by mounting a separable probe to the flange, the probe having a liquid passage leading from a location surrounded by the inner circumferential seal and an actuator axially engaging the outer end of the valve stem.

27. The method of claim 26, comprising the following additional step:

applying vacuum pressure to the liquid passage to draw fuel from a fuel cell through the fuel drain about which the flange is attached.

* * * * *